United States Patent
Lee

(10) Patent No.: US 11,941,294 B2
(45) Date of Patent: Mar. 26, 2024

(54) MEMORY CONTROLLER FOR CONTROLLING SUSPENSION OF OPERATION AND METHOD OF OPERATING THE SAME

(71) Applicant: SK hynix Inc., Gyeonggi-do (KR)

(72) Inventor: Eui Dong Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 108 days.

(21) Appl. No.: 17/570,022

(22) Filed: Jan. 6, 2022

(65) Prior Publication Data

US 2022/0391140 A1 Dec. 8, 2022

(30) Foreign Application Priority Data

Jun. 8, 2021 (KR) ........................ 10-2021-0074347

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

| | | | | |
|---|---|---|---|---|
| 2016/0224255 A1* | 8/2016 | Park | ...................... | G06F 3/0679 |
| 2016/0313946 A1* | 10/2016 | Zang | ..................... | G06F 3/0611 |
| 2018/0232178 A1* | 8/2018 | Iwaki | ..................... | G06F 3/0659 |
| 2019/0004710 A1* | 1/2019 | Ebsen | .................... | G06F 3/0679 |
| 2020/0117378 A1* | 4/2020 | Hsu | ....................... | G06F 3/0659 |
| 2020/0257552 A1* | 8/2020 | Park | ....................... | G06F 9/485 |
| 2020/0285416 A1* | 9/2020 | Wu | ....................... | G06F 3/0679 |
| 2020/0303019 A1* | 9/2020 | Palmer | .................. | G11C 16/26 |
| 2021/0271409 A1* | 9/2021 | Ben-Rubi | ............. | G06F 3/0659 |
| 2022/0057966 A1* | 2/2022 | Kanno | .................. | G06F 3/0688 |

FOREIGN PATENT DOCUMENTS

KR 10-2019-0088734 A 7/2019
KR 10-2021-0029551 A 3/2021

* cited by examiner

*Primary Examiner* — Tracy A Warren
(74) *Attorney, Agent, or Firm* — IP & T GROUP LLP

(57) ABSTRACT

A memory controller and a method of operating the same. The memory controller which increases the number of read commands to be performed during a suspend period may include a command generator configured to receive a request from a host and generate a command corresponding to the request, a command queue configured to store the generated command, a command controller configured to control the command queue so that the command stored in the command queue is output to the memory device, and a suspension controller configured to, when a read request is input from the host while the memory device is performing an operation, determine a delay amount of time based on a number of read commands stored in the command queue and provide a suspend command that instructs suspension of performance of the operation to the memory device after the delay amount of time has elapsed.

20 Claims, 11 Drawing Sheets

| | tDELAY |
|---|---|
| RC_NUM ≥ X | 0 |
| RC_NUM = X−1 | Y |
| RC_NUM = X−2 | Y+Z |
| RC_NUM < X−2 | Y+Z*(X−1) |

| | tDELAY |
|---|---|
| RC_NUM ≥ 10 | 0 |
| RC_NUM = 9 | 1 |
| RC_NUM = 8 | 2 |
| RC_NUM < 8 | 10 |

MEMORY CONTROLLER FOR CONTROLLING SUSPENSION OF OPERATION AND METHOD OF OPERATING THE SAME

CROSS-REFERENCE TO RELATED APPLICATION

The present application claims priority under 35 U.S.C. § 119(a) to Korean patent application number 10-2021-0074347, filed on Jun. 8, 2021, and which is incorporated herein by reference in its entirety.

BACKGROUND

Field of Invention

Various embodiments of the present disclosure generally relate to an electronic device, and more particularly to a memory controller and a method of operating the memory controller.

Description of Related Art

A storage device is a device which stores data under the control of a host device such as a computer, a smartphone, or a smartpad. Examples of the storage device include a device such as a hard disk drive (HDD) which stores data in a magnetic disk, and a device such as a solid state drive (SSD) or a memory card which stores data in a semiconductor memory, particularly, a nonvolatile memory, according to the device in which data is stored.

The storage device may include a memory device in which data is stored and a memory controller which controls the storage of data in the memory device. Such memory devices may be classified into a volatile memory and a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments of the present disclosure are directed to a memory controller that improves the performance of a storage device by delaying the time point at which a suspend command is to be output, and a method of operating the memory controller.

An embodiment of the present disclosure may provide for a memory controller for controlling a memory device. The memory controller may include a command generator configured to receive a request from a host and generate a command corresponding to the request, a command queue configured to store the generated command, a command controller configured to control the command queue to provide the memory device with the command stored in the command queue, and a suspension controller configured to, when a read request is input to the command generator from the host while the memory device is performing an operation, determine a delay amount of time based on a number of read commands stored in the command queue and provide, after the delay amount of time has elapsed, the memory device with a suspend command that instructs suspension of the operation.

An embodiment of the present disclosure may provide for a method of operating a memory controller including a command queue in which commands to be performed by a memory device are stored. The method may include sequentially providing the commands stored in the command queue to the memory device, determining a delay amount of time depending on a number of read commands stored in the command queue when a read request is input thereto from a host while the memory device is performing an operation in response to each of the provided command, providing after the delay amount of time has elapsed, the memory device with a suspend command that instructs suspension of the operation, and providing, after the suspend command has been provided to the memory device, the memory device with the read commands stored in the command queue.

An embodiment of the present disclosure may provide for a storage device. The storage device may include a memory device configured to perform an operation in response to an input command, and a memory controller configured to receive a request from a host, generate a command corresponding to the request, store the generated command in a command queue, control the command queue to provide the memory device sequentially with commands stored in the command queue, as the input command, determine, when a read request is input from the host while the memory device is performing an operation corresponding to the commands, a delay amount of time based on a number of read commands stored in the command queue, and provide, after the delay amount of time has elapsed, the memory device with a suspend command that instructs suspension of performance of the operation.

DETAILED DESCRIPTION

Specific structural or functional descriptions in the embodiments of the present disclosure introduced in this specification are illustrated to describe embodiments according to the concept of the present disclosure. The embodiments according to the concept of the present disclosure may be practiced in various forms, and should not be construed as being limited to the embodiments described in this specification.

Figure 1:
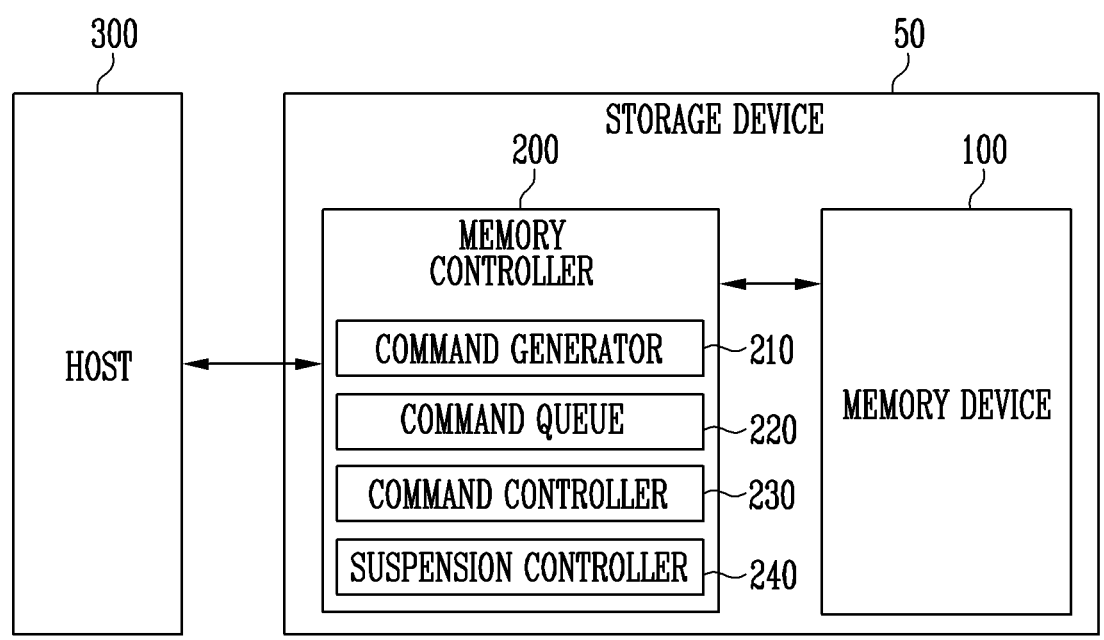
FIG. 1 is a block diagram illustrating a storage device.

FIG. 1 is a block diagram illustrating a storage device in accordance with an embodiment of the present disclosure.

Referring to FIG. 1, a storage device 50 may include a memory device 100 and a memory controller 200.

The storage device 50 may be a device which stores data under the control of a host 300, such as a mobile phone, a smartphone, an MP3 player, a laptop computer, a desktop computer, a game console, a television (TV), a tablet PC, or an in-vehicle infotainment system.

The storage device 50 may be manufactured as any one of various types of storage devices depending on a host interface that is a scheme for communication with the host 300. For example, the storage device 50 may be implemented as any of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The storage device 50 may be manufactured in various types of package forms. For example, the storage device 50 may be manufactured in various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 is operated in response to the control of the memory controller 200. The memory device 100 may include a memory cell array including a plurality of memory cells which store data. The memory cell array may include a plurality of memory blocks. Each memory block may include a plurality of memory cells, which may constitute a plurality of pages. In an embodiment, each page may be a unit by which data is stored in the memory device 100 or by which data stored in the memory device 100 is read. A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magnetoresistive RAM (MRAM), a ferroelectric RAM (FRAM), or a spin transfer torque RAM (SU-RAM). In the present specification, for convenience of description, a description will be made for a memory device 100 which is a NAND flash memory.

The memory device 100 may be implemented in a two-dimensional (2D) array structure or a three-dimensional (3D) array structure. Hereinafter, although a 3D array structure is described as an embodiment, the present disclosure is not limited to the 3D array structure. The present disclosure may be applied not only to a flash memory device in which a charge storage layer is formed of a conductive floating gate (FG), but also to a charge trap flash (CTF) memory device in which a charge storage layer is formed of an insulating layer.

In an embodiment, the memory device 100 may be operated in a single-level cell (SLC) manner in which one data bit is stored in one memory cell. Alternatively, the memory device 100 may be operated in a manner in which at least two data bits are stored in one memory cell. For example, the memory device 100 may be operated in a multi-level cell (MLC) manner in which two data bits are stored in one memory cell, a triple-level cell (TLC) manner in which three data bits are stored in one memory cell, or a quadruple-level cell (QLC) manner in which four data bits are stored in one memory cell.

The memory device 100 may receive a command and an address from the memory controller 200, and may access the area of the memory cell array, selected by the address. That is, the memory device 100 may perform an operation in response to the command on the area selected by the address. For example, the memory device 100 may perform a write operation (i.e., program operation), a read operation, or an erase operation in response to the received command. When a program command is received, the memory device 100 may program data to the area selected by the address. When a read command is received, the memory device 100 may read data from the area selected by the address. When an erase command is received, the memory device 100 may erase data stored in the area selected by the address.

The memory controller 200 may control the overall operation of the storage device 50.

When a supply voltage is applied to the storage device 50, the memory controller 200 may run firmware. When the memory device 100 is a flash memory device, the memory controller 200 may run firmware such as a Flash Translation Layer (FTL) for controlling communication between the host 300 and the memory device 100.

In an embodiment, the memory controller 200 may include firmware (not illustrated) which may receive data and a logical block address (LBA) from the host 300, and may translate the logical block address (LBA) into a physical block address (PBA) indicating the address of memory cells which are included in the memory device 100 and in which data is to be stored. Further, the memory controller 200 may store a logical-physical address mapping table, which configures mapping relationships between logical block addresses (LBA) and physical block addresses (PBA), in a buffer memory.

The memory controller 200 may control the memory device 100 so that a program operation, a read operation or an erase operation is performed in response to a request received from the host 300. For example, when a program request is received from the host 300, the memory controller 200 may convert the program request into a program command, and may provide the program command, a physical block address (PBA), and data to the memory device 100. When a read request together with a logical block address is received from the host 300, the memory controller 200 may convert the read request into a read command, select a physical block address corresponding to the logical block address, and thereafter provide the read command and the physical block address (PBA) to the memory device 100. When an erase request together with a logical block address is received from the host 300, the memory controller 200 may convert the erase request into an erase command, select a physical block address corresponding to the logical block address, and thereafter provide the erase command and the physical block address (PBA) to the memory device 100.

In an embodiment, the memory controller 200 may include a command generator 210, a command queue 220, a command controller 230, and a suspension controller 240.

In an embodiment, the command generator 210 may generate a command corresponding to a request received from the host 300, and may store the command in the command queue 220. The command controller 230 may control the command queue 220 so that the commands stored (queued) in the command queue 220 are sequentially output to the memory device 100 when each of the memory device 100 and the memory controller 200 is in an operable state. The commands stored in the command queue 220 may be sequentially output to the memory device 100, and the memory device 100 may perform operations in response to the received commands.

In detail, when a program request, a read request, or an erase request is received from the host 300, the command generator 210 may store a program command corresponding to the program request, a read command corresponding to the read request, or an erase command corresponding to the erase request in the command queue 220. When the program command, the read command, or the erase command is stored in the command queue 220, the command controller 230 may control the command queue 220 so that the commands stored in the command queue 220 are sequentially output to the memory device 100 in the order in which the commands are stored in the command queue 220. The memory device 100 may receive the commands output from the command queue 220, and may perform operations respectively in response to the received commands.

In an embodiment, the command generator 210 may receive a read request from the host 300 while the memory device 100 performs a program operation in response to the program command or an erase operation in response to the erase command. The read request may be a request made by the host 300 to instruct data stored in one of a plurality of pages included in the memory device 100 to be read.

In an embodiment, a relatively long time may be required to perform the program operation or the erase operation, compared to the read operation. Therefore, in order to improve latency, indicating the performance of the storage device 50, the program operation or the erase operation being performed may be suspended, and the read operation may be preferentially performed.

Therefore, when the read request is received from the host 300, the command generator 210 may generate a read command corresponding to the read request, store the read command in the command queue 220, and thereafter notify the suspension controller 240 that the read command has been stored in the command queue 220. When the read command is stored in the command queue 220, the suspension controller 240 may generate a suspend command and output the suspend command to the memory device 100 to suspend the operation being performed on the memory device 100, that is, to preferentially perform an operation in response to the read command. The memory device 100 may suspend the operation being performed in response to the suspend command. When the operation being performed on the memory device 100 is a program operation, data to be programmed may be backed up while the program operation is suspended.

In an embodiment, after the memory device 100 suspends the currently performed operation in response to the suspend command, the memory device 100 may preferentially perform a read operation. However, when a number of read operations performed after the memory device 100 suspends the currently performed operation is small, the suspension controller 240 may frequently output the suspend command in response to a read request received within a predetermined period of time after suspension of the operation.

The more frequently the suspend command is output, the more latency is degraded. As the latency is degraded, the waiting time between operations performed on the memory device 100 may be lengthened.

Therefore, the present disclosure presents a method of delaying the time point at which the suspend command is output, by a delay amount of time corresponding to a number of read commands stored in the command queue 220. According to an embodiment of the present disclosure, the suspend command may be delayed by the delay amount of time from a time point when it is originally supposed to be output. The time point when the suspend command is originally supposed to be output may be a time point when the read command is enqueued in the command queue 220.

In an embodiment, the suspension controller 240 may determine the delay amount of time of output of the suspend command.

In detail, when the suspension controller 240 receives information indicating that a read command is stored in the command queue 220 from the command generator 210, the suspension controller 240 may receive information about the number of read commands stored in the command queue 220 from the command queue 220. The suspension controller 240 may output the suspend command based on the information received from the command queue 220. Here, the suspension controller 240 may determine the delay amount of time of output of the suspend command depending on the number of read commands stored in the command queue 220, and may determine the time point at which the suspend command is to be output based on the determined delay amount of time.

In an embodiment, the memory controller 200 may control at least two memory devices. In this case, the memory controller 200 may control the memory devices according to an interleaving scheme to improve operating performance.

The host 300 may communicate with the storage device 50 using at least one of various communication standards or interfaces, such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
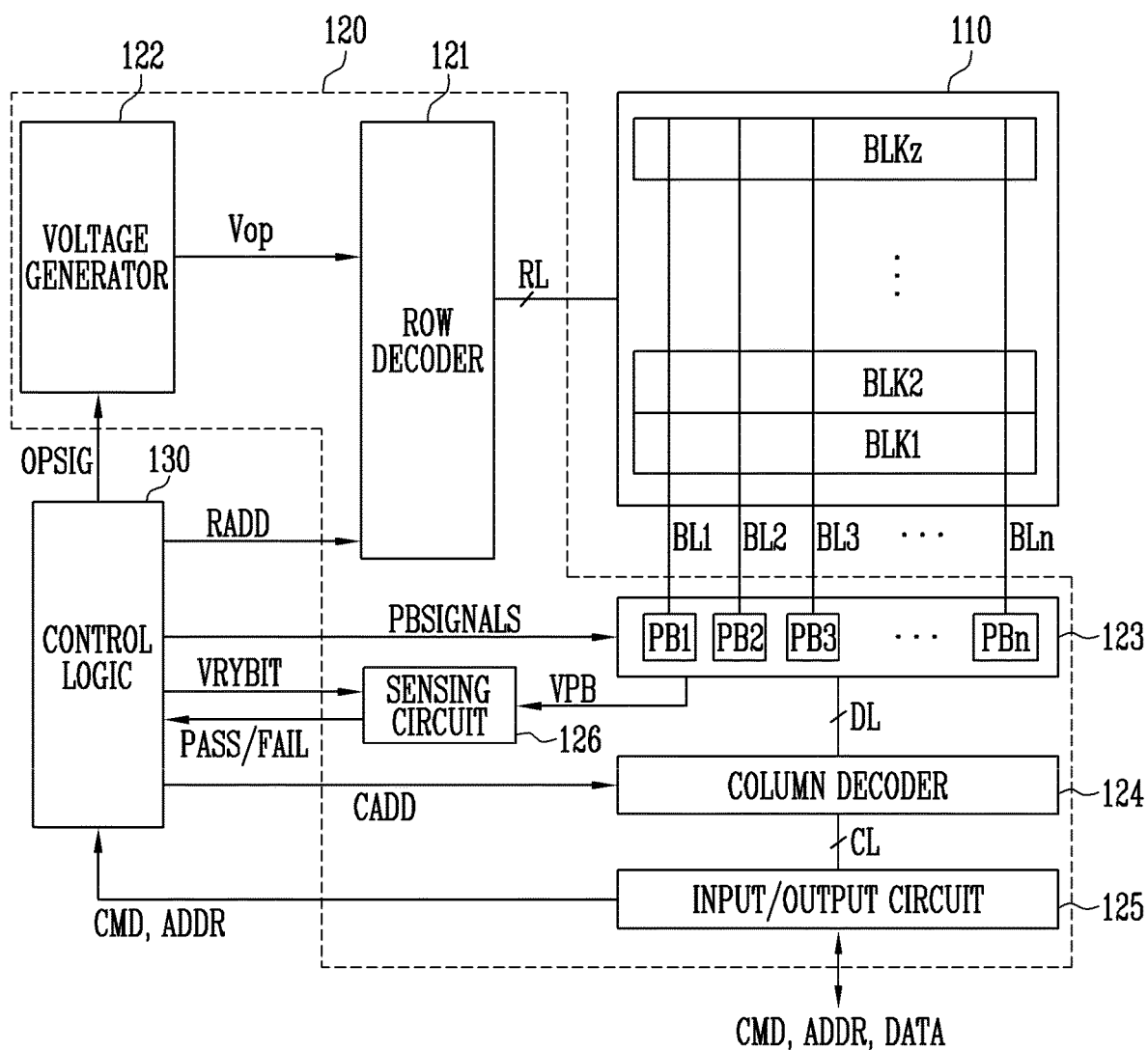
FIG. 2 is a diagram illustrating the structure of a memory device of FIG. 1.

FIG. 2 is a diagram illustrating the structure of the memory device of FIG. 1 in accordance with an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to a row decoder 121 through row lines RL. Each of the memory blocks BLK1 to BLKz may be coupled to a page buffer group 123 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as a single page. Therefore, a single memory block may include a plurality of pages.

The row lines RL may include at least one source select line, a plurality of word lines, and at least one drain select line.

Each of the memory cells included in the memory cell array 110 may be implemented as a single-level cell (SLC) capable of storing one data bit, a multi-level cell (MLC) capable of storing two data bits, a triple-level cell (TLC) capable of storing three data bits, or a quadruple-level cell (QLC) capable of storing four data bits.

The peripheral circuit 120 may perform a program operation, a read operation, or an erase operation on a selected area of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, a voltage generator 122, the page buffer group 123, a column decoder 124, an input/output circuit 125, and a sensing circuit 126.

The row decoder 121 is coupled to the memory cell array 110 through the row lines RL. The row lines RL may include the at least one source select line, the plurality of word lines, and the at least one drain select line. In an embodiment, the word lines may include normal word lines and dummy word lines. In an embodiment, the row lines RL may further include a pipe select line.

The row decoder 121 may decode a row address RADD received from the control logic 130. The row decoder 121 selects at least one of the memory blocks BLK1 to BLKz according to the decoded address. Further, the row decoder 121 may select at least one word line WL of the selected memory block so that voltages generated by the voltage generator 122 are applied to the at least one word line WL according to the decoded address.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, the erase operation of the memory device 100 is performed on a memory block basis. During an erase operation, the row decoder 121 may select one memory block according to the decoded address. During the erase operation, the row decoder 121 may apply a ground voltage to word lines coupled to the selected memory block.

The voltage generator 122 may be operated under the control of the control logic 130. The voltage generator 122 may generate a plurality of voltages using an external supply voltage provided to the memory device 100. In detail, the voltage generator 122 may generate various operating voltages Vop that are used for program, read, and erase operations in response to an operation signal OPSIG. For example, the voltage generator 122 may generate a program voltage, a verify voltage, a pass voltage, a read voltage, an erase voltage, etc. under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate a plurality of voltages using the external supply voltage or the internal supply voltage.

For example, the voltage generator 122 may include a plurality of pumping capacitors for receiving the internal supply voltage and generate a plurality of voltages by selectively enabling the plurality of pumping capacitors under the control of the control logic 130.

The generated voltages may be supplied to the memory cell array 110 by the row decoder 121.

The page buffer group 123 includes first to nth page buffers PB1 to PBn. The first to nth page buffers PB1 to PBn are coupled to the memory cell array 110 through the first to nth bit lines BL1 to BLn. The first to nth page buffers PB1 to PBn are operated under the control of the control logic 130. In detail, the first to nth page buffers PB1 to PBn may be operated in response to page buffer control signals PBSIGNALS. For example, the first to nth page buffers PB1 to PBn may temporarily store data received through the first to nth bit lines BL1 to BLn or may sense voltages or currents of the bit lines BL1 to BLn during a read or verify operation.

In detail, during a program operation, when the program voltage is applied to the selected word line, the first to nth page buffers PB1 to PBn may transfer the data DATA, received through the input/output circuit 125, to selected memory cells through the first to nth bit lines BL1 to BLn. The memory cells in the selected page are programmed based on the received data DATA. During a program verify operation, the first to nth page buffers PB1 to PBn may read page data by sensing the voltages or currents received through the first to nth bit lines BL1 to BLn from the selected memory cells.

During a read operation, the first to nth page buffers PB1 to PBn may read data DATA from the memory cells in the selected page through the first to nth bit lines BL1 to BLn, and may output the read data DATA to the input/output circuit 125 under the control of the column decoder 124.

During the erase operation, the first to nth page buffers PB1 to PBn may allow the first to nth bit lines BL1 to BLn to float or may apply the erase voltage to the first to nth bit lines BL1 to BLn.

The column decoder 124 may transfer data between the input/output circuit 125 and the page buffer group 123 in response to a column address CADD. For example, the column decoder 124 may exchange data with the first to nth page buffers PB1 to PBn through data lines DL or may exchange data with the input/output circuit 125 through column lines CL.

The input/output circuit 125 may transfer a command CMD and an address ADDR, received from the memory controller (e.g., 200 of FIG. 1) described above with reference to FIG. 1, to the control logic 130, or may exchange data DATA with the column decoder 124.

During a read operation or a verify operation, the sensing circuit 126 may generate a reference current in response to an enable bit VRYBIT, and may compare a sensing voltage VPB received from the page buffer group 123 with a reference voltage generated by the reference current and then output a pass signal PASS or a fail signal FAIL.

The control logic 130 may control the peripheral circuit 120 by outputting the operation signal OPSIG, the row address RADD, the page buffer control signals PBSIG-NALS, and the enable bit VRYBIT in response to the command CMD and the address ADDR. For example, the control logic 130 may control a read operation on a selected memory block in response to a sub-block read command and an address. Also, the control logic 130 may control an erase operation on a selected sub-block included in a selected memory block in response to a sub-block erase command and an address. In addition, the control logic 130 may determine whether a verify operation has passed or failed in response to the pass or fail signal PASS or FAIL.

Figure 3:
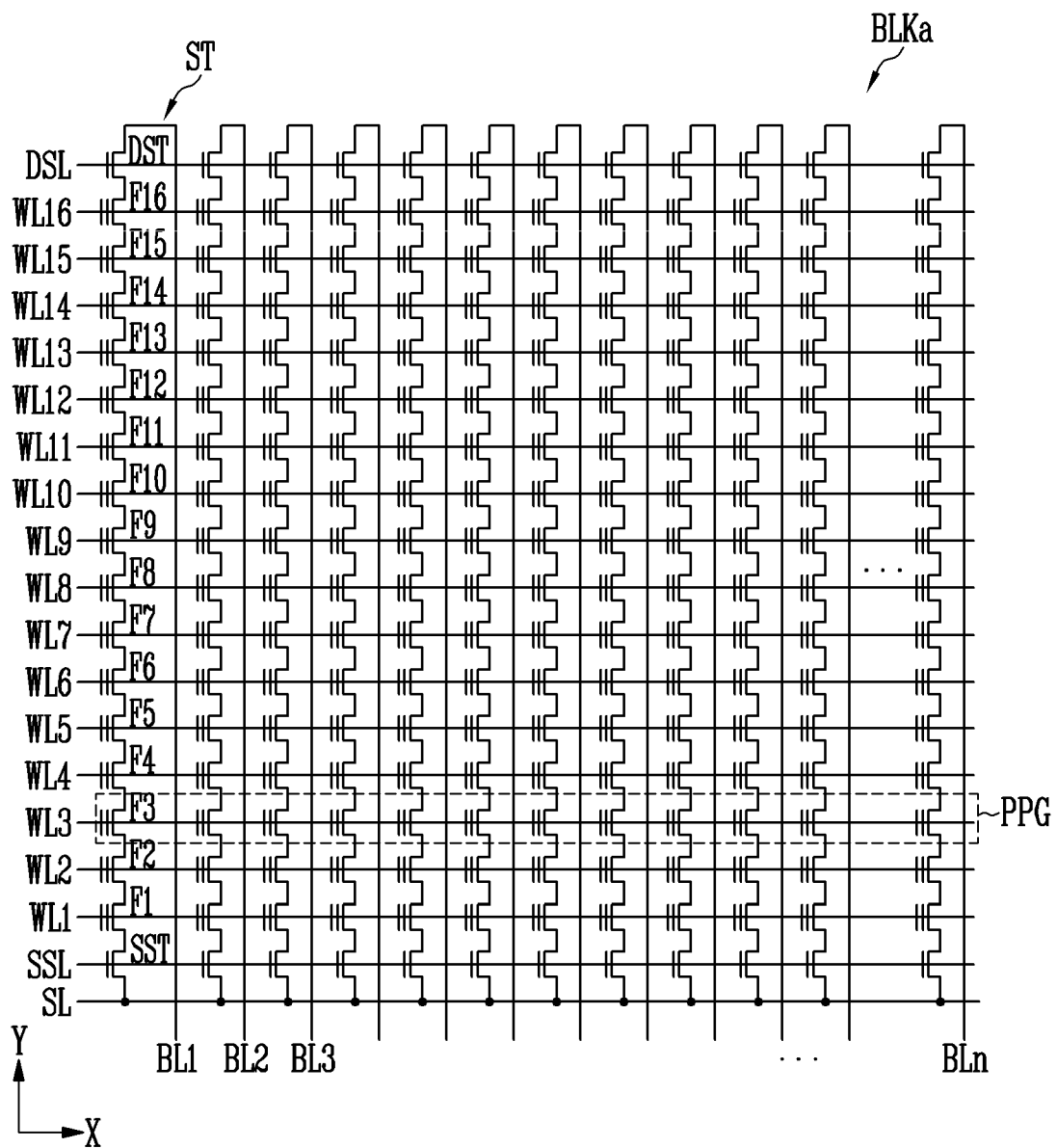
FIG. 3 is a diagram illustrating an embodiment of a memory cell array of FIG. 2.

FIG. 3 is a diagram illustrating an example of the memory cell array of FIG. 2 in accordance with an embodiment of the present disclosure.

Referring to FIGS. 2 and 3, FIG. 3 is a circuit diagram illustrating a memory block BLKa of a plurality of memory blocks BLK1 to BLKz included in the memory cell array 110 of FIG. 2.

The memory block BLKa may be coupled to a first select line, word lines, and a second select line that are coupled in parallel to each other. For example, the word lines may be coupled in parallel to each other between the first and second select lines. Here, the first select line may be a source select line SSL, and the second select line may be a drain select line DSL.

In detail, the memory block BLKa may include a plurality of strings coupled between bit lines BL1 to BLn and a source line SL. The bit lines BL1 to BLn may be coupled to the strings, respectively, and the source line SL may be coupled in common to the strings. Since the strings may be equally configured, a string ST coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. A single string ST may include at least one source select transistor SST and at least one drain select transistor DST, and more memory cells than the memory cells F1 to F16 illustrated in the drawing may be included in the string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors included in different strings ST may be coupled to the source select line SSL, gates of the drain select transistors included in different strings ST may be coupled to the drain select line DSL, and gates of the memory cells F1 to F16 may be coupled to a plurality of word lines WL1 to WL16, respectively. A group of memory cells coupled to the same word line, among the memory cells included in different strings ST, may be referred to as a "physical page: PPG". Therefore, the memory block BLKa may include a number of physical pages PPG identical to the number of word lines WL1 to WL16.

One memory cell may store one bit of data. This cell is typically designated as a "single-level cell: SLC". Here, one physical page PPG may store data corresponding to one logical page LPG. The data corresponding to one logical page LPG may include a number of data bits identical to the number of memory cells included in one physical page PPG. Alternatively, one memory cell may store two or more bits of data. This cell is typically designated as a "multi-level cell: MLC". Here, one physical page PPG may store data corresponding to two or more logical pages LPG.

A memory cell in which two or more bits of data are stored in one memory cell is called a multi-level cell (MLC). However, recently, as the number of data bits stored in one memory cell increases, the multi-level cell (MLC) refers to a memory cell in which two bits of data are stored, and thus a memory cell in which three or more bits of data are stored is called a triple-level cell (TLC) and a memory cell in which four or more bits of data are stored is called a quadruple-level cell (QLC). In addition, a memory cell scheme in which multiple bits of data are stored has been developed, and the present embodiment may be applied to the memory device 100 in which two or more bits of data are stored.

In an embodiment, each of the memory blocks may have a three-dimensional (3D) structure. Each of the memory blocks may include a plurality of memory cells stacked on a substrate. The plurality of memory cells are arranged in +X, +Y, and +Z directions.

Figure 4:
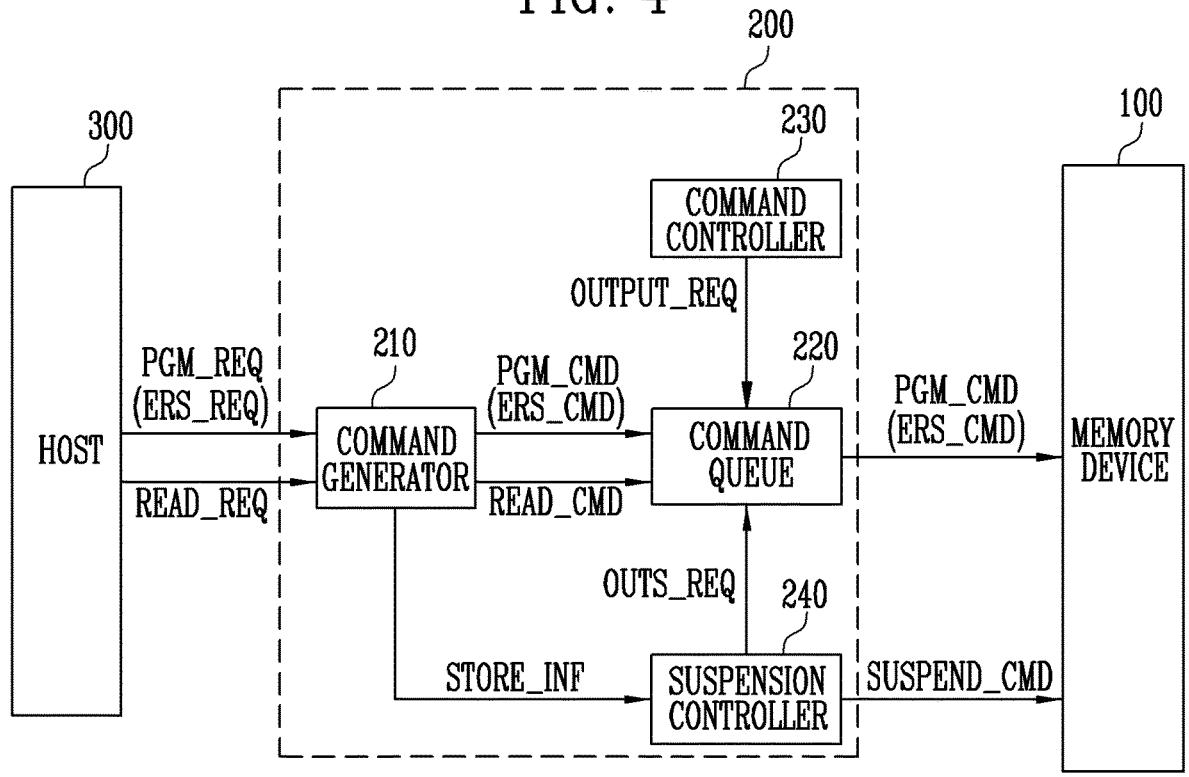
FIG. 4 illustrates a process in which a suspend command is output.

FIG. 4 illustrates a process in which a suspend command is output in accordance with an embodiment of the present disclosure.

Referring to FIG. 4, the process in which a read request READ_REQ is received from a host 300 and thereafter a suspend command SUSPEND_CMD is output to a memory device 100 is illustrated in FIG. 4.

In an embodiment, the host 300 may output a program request PGM_REQ, a read request, or an erase request ERS_REQ to the memory controller 200. The program request PGM_REQ may be a request instructing that data is to be programmed to the memory device 100, the read request may be a request instructing that data stored in selected memory cells included in the memory device 100, is to be read, and the erase request ERS_REQ may be a request instructing that one of a plurality of memory blocks included in the memory device 100 is to be erased.

In an embodiment, the command generator 210 may receive the program request PGM_REQ or the erase request ERS_REQ from the host 300, and may store a program command PGM_CMD corresponding to the program request PGM_REQ or an erase command ERS_CMD corresponding to the erase request ERS_REQ in the command queue 220. Here, the order in which the commands are stored in the command queue 220 may be the order in which the requests are received from the host 300.

When the commands are stored in the command queue 220, the command controller 230 may provide the command queue 220 with an output request OUTPUT_REQ that requests the commands stored in the command queue 220 to be output based on the states of the memory controller 200 and the memory device 100. For example, when each of the memory controller 200 and the memory device 100 is in an operable state, the command controller 230 may provide the output request OUTPUT_REQ to the command queue 220.

The command queue 220 may sequentially output the stored commands in the order in which the commands are stored in response to the output request OUTPUT_REQ received from the command controller 230. That is, the program command PGM_CMD or the erase command ERS_CMD stored in the command queue 220 may be sequentially output in the order in which the commands are stored. When the program command PGM_CMD or the erase command ERS_CMD is output to the memory device 100, the memory device 100 may perform a program operation in response to the program command PGM_CMD or an erase operation in response to the erase command ERS_CMD.

In an embodiment, while the memory device performs the program operation or the erase operation, the memory controller 200 may receive the read request READ_REQ from the host 300. However, because the memory device 100 is performing the operation, the memory controller 200 may control the memory device 100 so that a read operation is preferentially performed to improve latency.

In detail, when the command generator 210 receives the read request READ_REQ from the host 300, a read command READ_CMD corresponding to the read request READ_REQ may be stored in the command queue 220. Thereafter, the command generator 210 may output storage information STORE_INF, indicating that the read command READ_CMD has been stored in the command queue 220, to the suspension controller 240.

The suspension controller 240 may output the suspend command SUSPEND_CMD to the memory device 100 based on the storage information STORE_INF received from the command generator 210. Further, in order for the memory device 100 to suspend the operation in response to the suspend command SUSPEND_CMD, the suspension controller 240 may provide the command queue 220 with an output suspend request OUTS_REQ, which instructs the command queue 220 not to output the commands from the command queue 220 to the memory device 100.

In an embodiment, the memory device 100 may suspend the program operation or the erase operation being performed in response to the suspend command SUSPEND_CMD, and may store log information about the suspended operation. In this case, when the operation being performed on the memory device 100 is a program operation, data to be programmed may be backed up. After the read operation has been performed, the suspended operation may be resumed based on the stored log information.

As a result, because the program operation or the erase operation may consume more time than the read operation, the program operation or the erase operation being performed may be suspended, and the read operation may be preferentially performed to improve latency. That is, in order to preferentially perform the read operation, when the memory controller 200 outputs the suspend command SUSPEND_CMD to the memory device 100, the memory device 100 may preferentially perform the read operation after suspending the operation being performed.

Figure 5:
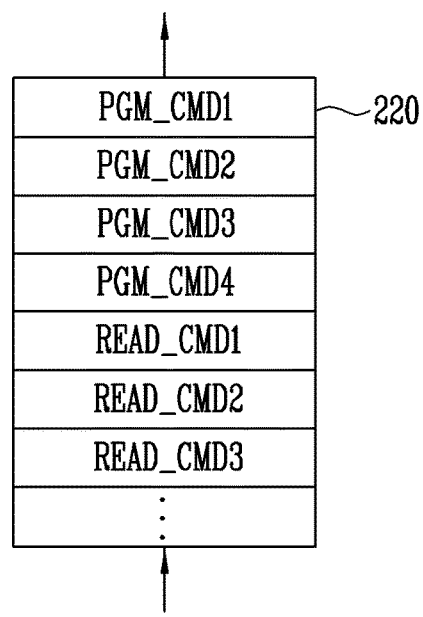
FIG. 5 illustrates commands stored in a command queue of FIG. 4.

FIG. 5 illustrates commands stored in the command queue of FIG. 4 in accordance with an embodiment of the present disclosure.

Referring to FIGS. 4 and 5, a process in which a command corresponding to a request received from the host of FIG. 4 (e.g., 300 of FIG. 4) is output after being stored in the command queue 220 is illustrated in FIG. 5.

In an embodiment, the command generator (e.g., 210 of FIG. 4) may receive a request from the host (e.g., 300 of FIG. 4). The command generator (e.g., 210 of FIG. 4) may generate a command corresponding to the request received from the host (e.g., 300 of FIG. 4), and may store the command in the command queue 220.

For example, the command generator (e.g., 210 of FIG. 4) may sequentially receive first to fourth program requests PGM_REQ1 to PGM_REQ4 from the host (e.g., 300 of FIG. 4). The command generator (e.g., 210 of FIG. 4) may generate first to fourth program commands PGM_CMD1 to PGM_CMD4 corresponding to the received first to fourth program requests PGM_REQ1 to PGM_REQ4, and may store the first to fourth program commands PGM_CMD1 to PGM_CMD4 in the command queue 220.

The commands stored in the command queue 220 may be sequentially output to the memory device (e.g., 100 of FIG. 4) in the order in which the commands are stored in the command queue 220. The memory device (e.g., 100 of FIG. 4) may receive the commands, and may perform operations in response to the commands.

Referring to FIG. 5, the first to fourth program commands PGM_CMD1 to PGM_CMD4 stored in the command queue 220 may be sequentially output to the memory device (e.g., 100 of FIG. 4), and the memory device (e.g., 100 of FIG. 4) may perform program operations in response to the first to fourth program commands PGM_CMD1 to PGM_CMD4.

In an embodiment, while the memory device (e.g., 100 of FIG. 4) is performing the program operation in response to the fourth program command PGM_CMD4, the command generator (e.g., 210 of FIG. 4) may receive a read request from the host (e.g., 300 of FIG. 4).

When the read request is received from the host (e.g., 300 of FIG. 4), the memory device (e.g., 100 of FIG. 4) may perform operations required to preferentially perform the read operation after the operation being performed on the memory device has been suspended.

In detail, the command generator (e.g., 210 of FIG. 4) may store a read command corresponding to the read request in the command queue (e.g., 220 of FIG. 4), and may thereafter output storage information, indicating that the read command has been stored, to the suspension controller (e.g., 240 of FIG. 4). The suspension controller (e.g., 240 of FIG. 4) may output a suspend command SUSPEND_CMD to the memory device (e.g., 100 of FIG. 4) based on the storage information.

The memory device (e.g., 100 of FIG. 4) may suspend the program operation in response to the fourth program command PGM_CMD4 in response to the suspend command SUSPEND_CMD. Because the suspended operation is the program operation, the memory device (e.g., 100 of FIG. 4) may store log information about the program operation in response to the fourth program command PGM_CMD4 and program data. The log information about the program operation in response to the fourth program command PGM_CMD4 and the program data may be used when the program operation is resumed after the read operation has been performed.

In an embodiment, when the suspended operation is an erase operation, the memory device (e.g., 100 of FIG. 4) may store only log information about the erase operation, after which the log information may be used when the erase operation is resumed.

In an embodiment, after the memory device (e.g., 100 of FIG. 4) suspends the program operation in response to the fourth program command PGM_CMD4, read commands corresponding to the read request received from the host (e.g., 300 of FIG. 4) may be sequentially stored in the command queue 220. For example, first to third read commands READ_CMD1 to READ_CMD3 may be sequentially stored in the command queue 220.

The first to third read commands READ_CMD1 to READ_CMD3 stored in the command queue 220 may be sequentially output to the memory device (e.g., 100 of FIG. 4), and the memory device (e.g., 100 of FIG. 4) may perform read operations respectively in response to the first to third read commands READ_CMD1 to READ_CMD3.

In an embodiment, when the number of read operations performed after the memory device (e.g., 100 of FIG. 4) suspends the currently performed operation in response to the suspend command SUSPEND_CMD is smaller, a longer time may be consumed to store the log information about the suspended operation, re-read the log information, and resume the suspended operation. That is, when the number of read operations performed after the memory device (e.g., 100 of FIG. 4) suspends the currently performed operation is small, the operation being performed on the memory device (e.g., 100 of FIG. 4) is frequently suspended, and thus the performance of the storage device may be deteriorated.

Therefore, the present disclosure presents a method of increasing the number of read operations performed after the memory device (e.g., 100 of FIG. 4) suspends the currently performed operation.

Figure 6:
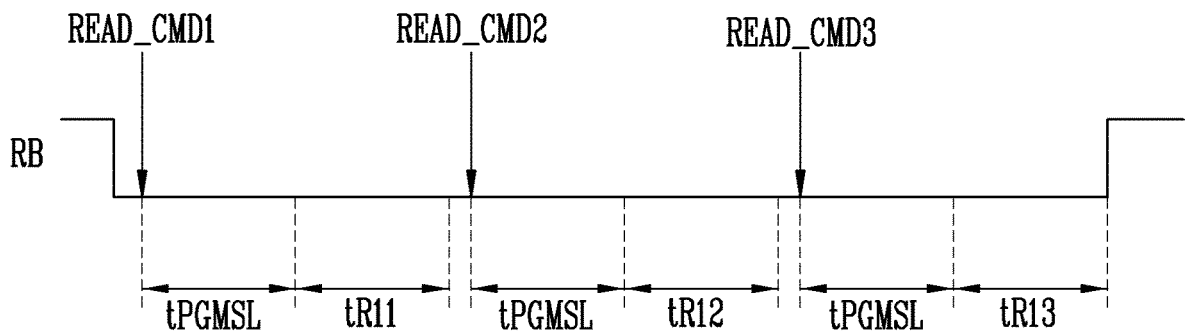
FIG. 6 illustrates a ready/busy signal depending on the operation of a memory device after a suspend command has been output from a memory controller.

FIG. 6 illustrates a ready/busy signal depending on the operation of a memory device after a suspend command has been output from a memory controller.

Referring to FIGS. 4 and 6, FIG. 6 illustrates a process in which, after a suspend command SUSPEND_CMD has been output from the memory controller (e.g., 200 of FIG. 4), a read command READ_CMD is output and a read operation is then performed on the memory device (e.g., 100 of FIG. 4).

In FIG. 6, the operation being performed on the memory device (e.g., 100 of FIG. 4) is a program operation. In an embodiment, the operation being performed on the memory device (e.g., 100 of FIG. 4) may be an erase operation.

In an embodiment, the memory device (e.g., 100 of FIG. 4) may receive the suspend command SUSPEND_CMD from the memory controller (e.g., 200 of FIG. 4), and may thereafter suspend the program operation being performed. When the program operation is suspended, the memory device (e.g., 100 of FIG. 4) may store log information about the suspended program operation, and may back up program data. Here, the time tPGMSL required to store the log information and back up the data may be consumed, and a ready/busy signal RB may be in a low state, indicating a busy state, during the time tPGMSL.

When the memory device (e.g., 100 of FIG. 4) stores the log information about the suspended program operation and backs up the data, the memory device (e.g., 100 of FIG. 4) may receive a first read command READ_CMD1 stored in the command queue, and may perform a read operation in response to the first read command READ_CMD1 for a time tR11. While the read operation is being performed, the ready/busy signal RB may be in a low state, indicating a busy state.

When a read command READ_CMD stored in the command queue is not present after the read operation in response to the first read command READ_CMD1 has been performed, the memory device (e.g., 100 of FIG. 4) may resume the suspended program operation.

After the memory device (e.g., 100 of FIG. 4) has resumed the suspended program operation, the memory device (e.g., 100 of FIG. 4) may again receive a suspend command SUSPEND_CMD from the memory controller (e.g., 200 of FIG. 4), and may suspend the program operation being performed. After suspending the program operation, the memory device (e.g., 100 of FIG. 4) may store log information about the suspended program operation and backs up data (tPGMSL), may receive a second read command READ_CMD2 stored in the command queue, and may perform a read operation in response to the second read command READ_CMD2 for a time tR12.

When a read command READ_CMD stored in the command queue is not present after the read operation in response to the second read command READ_CMD2 has been performed, the memory device (e.g., 100 of FIG. 4) may resume the suspended program operation.

After the memory device (e.g., 100 of FIG. 4) has resumed the suspended program operation, the memory device (e.g., 100 of FIG. 4) may again receive a suspend command SUSPEND_CMD from the memory controller (e.g., 200 of FIG. 4), and may suspend the program operation being performed. After suspending the program operation, the memory device (e.g., 100 of FIG. 4) may store log information about the suspended program operation and backs up data (tPGMSL), may receive a third read command READ_CMD3 stored in the command queue, and may perform a read operation in response to the third read command READ_CMD3 for a time tR13.

When a read command READ_CMD stored in the command queue is not present after the read operation in response to the third read command READ_CMD3 has been performed, the memory device (e.g., 100 of FIG. 4) may resume the suspended program operation.

When the read operations are performed through the above-described process, the number of read operations performed after the memory device (e.g., 100 of FIG. 4) suspends the program operation is small, and thus the operation of storing log information and backing up data after the suspension of the program operation may be frequently performed. That is, the more frequently the operation performed on the memory device (e.g., 100 of FIG. 4) is suspended, the more the performance of the memory device (e.g., 100 of FIG. 4) may be deteriorated.

Therefore, the present disclosure presents a method of increasing the number of read operations performed after the memory device (e.g., 100 of FIG. 4) suspends the program operation.

Figure 7:
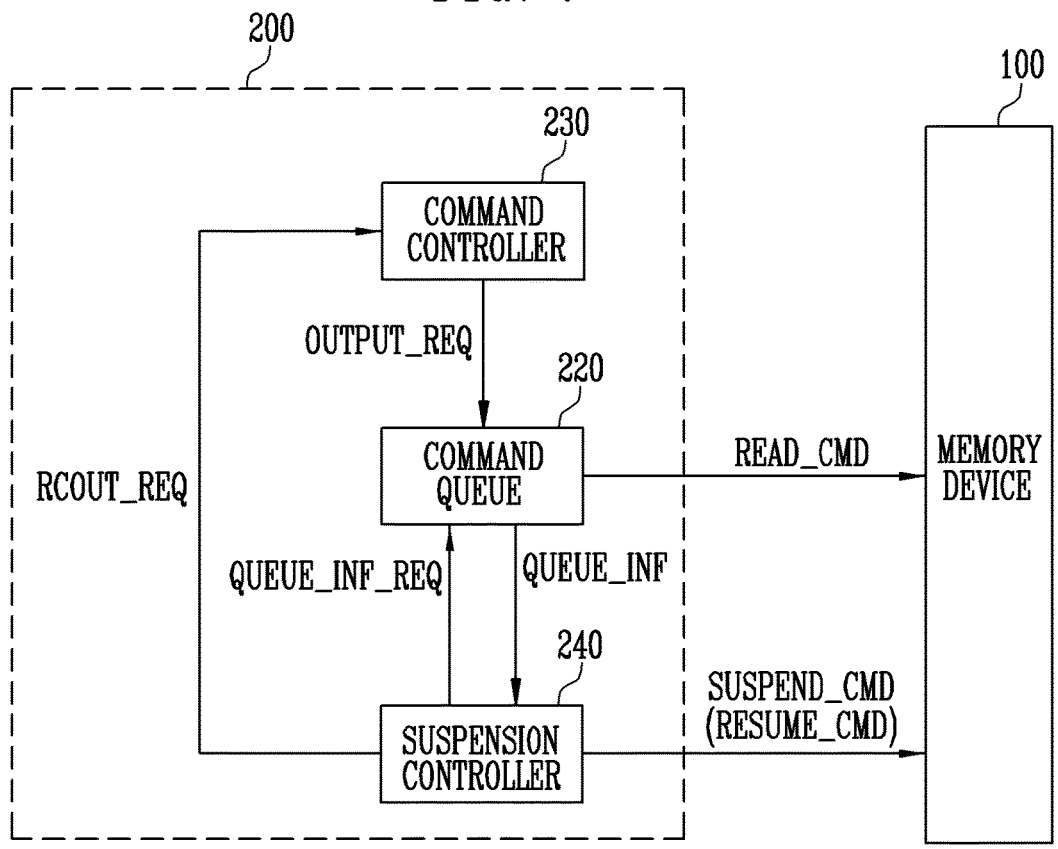
FIG. 7 illustrates a process in which the output of a suspend command is delayed.

FIG. 7 illustrates a process in which the output of a suspend command is delayed in accordance with an embodiment of the present disclosure.

Referring to FIG. 7, a process in which the memory device 100 suspends a program operation or an erase operation based on the number of read commands READ_CMD stored in the command queue 220 in order to preferentially perform a read operation when performing the program operation or the erase operation is illustrated in FIG. 7.

Referring to FIG. 4, FIG. 7 illustrates an operation performed after the command generator (e.g., 210 of FIG. 4) receives a read request READ_REQ from the host (e.g., 300 of FIG. 4), stores a read command corresponding to the read request READ_REQ in the command queue 220, and outputs storage information STORE_INF to the suspension controller 240 in FIG. 4.

In an embodiment, when the read command corresponding to the read request READ_REQ is stored in the command queue 220, the suspension controller 240 may output a suspend command SUSPEND_CMD to the memory device 100 so that a read operation in response to the read command corresponding to the read request READ_REQ is preferentially performed on the memory device 100. Also, the suspension controller 240 may output an output suspend request OUTS_REQ to the command queue 220 so that commands are not output to the memory device 100 for a period of time.

In this case, after the suspension controller 240 has determined the time point at which the suspend command SUSPEND_CMD is to be output, the suspension controller 240 may output the suspend command SUSPEND_CMD at the determined output time point.

For example, the suspension controller 240 may receive storage information STORE_INF, which indicates that the read command has been stored in the command queue 220, from the command generator (e.g., 210 of FIG. 4), and may thereafter output a queue information request QUEUE_INF_REQ, for acquiring the number of read commands READ_CMD stored in the command queue 220, to the command queue 220. The command queue 220 may output queue information QUEUE_INF corresponding to the queue information request QUEUE_INF_REQ to the suspension controller 240. Here, the queue information QUEUE_INF may include information about the number of read commands READ_CMD stored in the command queue 220.

In an embodiment, the suspension controller 240 may determine the delay amount of time of output of the suspend command SUSPEND_CMD based on the queue information QUEUE_IN F.

For example, when the number of read commands stored in the command queue 220 is large, the suspension controller 240 may immediately output the suspend command SUSPEND_CMD, or may set the delay amount of time of output of the suspend command SUSPEND_CMD to a shorter time. In contrast, when the number of read commands stored in the command queue 220 is small, the suspension controller 240 may set the delay amount of time of output of the suspend command SUSPEND_CMD to a longer time.

When the suspension controller 240 has determined the delay amount of time of output of the suspend command SUSPEND_CMD, the suspension controller 240 may output the suspend command SUSPEND_CMD after the determined delay amount of time has elapsed from a time point when the read command is enqueued in the command queue 220.

When the suspend command SUSPEND_CMD is output, the suspension controller 240 may provide the command controller 230 with a read command output request RCOUT_REQ for outputting the read commands stored in the command queue 220.

The command controller 230 may provide the command queue 220 with an output request OUTPUT_REQ for outputting the read commands stored in the command queue 220 in response to the read command output request RCOUT_REQ. The command queue 220 may preferentially output read commands, among the stored commands, in response to the output request OUTPUT_REQ.

When the suspend command SUSPEND_CMD is output to the memory device 100, the memory device 100 may suspend the currently performed operation in response to the suspend command SUSPEND_CMD. When the operation being performed on the memory device 100 is suspended, a read command READ_CMD corresponding to the read request READ_REQ received from the host 300 may be output from the command queue 220 to the memory device 100, and the memory device 100 may perform a read operation in response to the read command READ_CMD.

When the memory device 100 completes the read operations in response to the read commands READ_CMD stored in the command queue 220, the suspension controller 240 may determine whether a new read request READ_REQ is received from the host 300 during the read operations performed in response to the read commands READ_CMD stored in the command queue 220, and may perform a subsequent operation based on the result of the determination.

For example, when the new read request READ_REQ is received from the host 300, the command generator (e.g., 210 of FIG. 4) may store a read command corresponding to the new read request READ_REQ in the command queue 220, and may output storage information STORE_INF to the suspension controller 240. The suspension controller 240 may again receive queue information QUEUE_INF based on the storage information STORE_INF, and may then determine the number of read commands READ_CMD stored in the command queue 220.

The suspension controller 240 may determine a delay amount of time of output of a resume command RESUME_CMD, instructing resumption of the suspended operation based on the number of read commands READ_CMD stored in the command queue 220. Thereafter, when the delay amount of time of output of a resume command RESUME_CMD has elapsed, the suspension controller 240 may output the resume command RESUME CMD.

However, when a new read request READ_REQ is not received from the host 300, that is, when a request other than the read request READ_REQ is received and storage information STORE_INF is not output from the command generator (e.g., 210 of FIG. 4), the suspension controller 240 may output a resume command RESUME_CMD, instructing resumption of the suspended operation, to the memory device 100 without elapse of a delay amount of time. The memory device 100 may resume the suspended operation in response to the resume command RESUME_CMD.

Also, when the resume command RESUME_CMD is output, commands newly stored in the command queue 220 since the memory device 100 suspended the currently performed operation may be output to the memory device 100.

As a result, when the number of read commands stored in the command queue 220 is small, the delay amount of time of output of the suspend command SUSPEND_CMD may be set to a longer time, and thus the possibility that subsequent read commands will be stored in the command queue 220 may be increased. Therefore, after the suspension of operation of the memory device 100, read operations in response to more read commands may be performed on the memory device 100.

Figures 8A, 8B, 9:
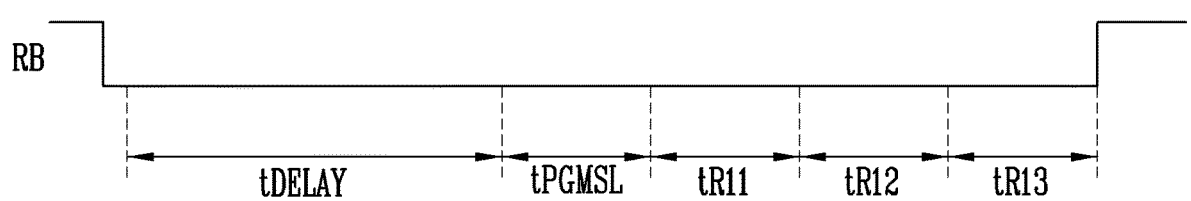
FIGS. 8A and 8B are diagrams illustrating a method of determining the time for which the output of a suspend command is to be delayed.
FIG. 9 illustrates a ready/busy signal when the output of a suspend command is delayed.

FIGS. 8A and 8B are diagrams illustrating a method of determining the time for which the output of a suspend command is to be delayed in accordance with an embodiment of the present disclosure.

Referring to FIGS. 7, 8A, and 8B, a suspend table included in the suspension controller (e.g., 240 of FIG. 7) is illustrated in FIGS. 8A and 8B. Also, FIGS. 8A and 8B illustrate a method in which the suspension controller (e.g., 240 of FIG. 7) receives queue information QUEUE_INF from the command queue (e.g., 220 of FIG. 7) and determines the delay amount of time tDELAY of output of the suspend command SUSPEND_CMD based on the suspend table in FIGS. 8A and 8B.

FIG. 8A illustrates an embodiment of the method for determining the delay amount of time tDELAY based on the suspend table, and FIG. 8B illustrates an example of the determined delay amount of time tDELAY.

In FIGS. 8A and 8B, the unit of the delay amount of time tDELAY is a 'las'.

In an embodiment, the queue information QUEUE_INF may include information about the number of read commands RC_NUM stored in the command queue (e.g., 220 of FIG. 7). The delay amount of time tDELAY of output of the suspend command SUSPEND_CMD may be determined based on the information about the number of read commands RC_NUM included in the queue information QUEUE_INF.

Referring to FIG. 8A, when the number of read commands RC_NUM is equal to or greater than 'X', the delay amount of time tDELAY may be '0'. That is, when the number of read commands RC_NUM stored in the command queue (e.g., 220 of FIG. 7) is equal to or greater than a predetermined value, the suspension controller (e.g., 240 of FIG. 7) may immediately output the suspend command SUSPEND_CMD without delay.

When the number of read commands RC_NUM is 'X−1', the delay amount of time tDELAY may be 'Y', when the number of read commands RC_NUM is 'X−2', the delay amount of time tDELAY may be 'Y+Z', and when the number of read commands RC_NUM is less than 'X−2', the delay amount of time tDELAY may be 'Y+Z*(X−1)'. That is, as the number of read commands RC_NUM stored in the command queue (e.g., 220 of FIG. 7) is decreased, the delay amount of time tDELAY of output of the suspend command SUSPEND_CMD may be increased.

As a result, the number of read commands RC_NUM stored in the command queue (e.g., 220 of FIG. 7) during the delay amount of time tDELAY of output of the suspend command SUSPEND_CMD may be increased by increasing the delay amount of time tDELAY as the number of read commands RC_NUM stored in the command queue (e.g., 220 of FIG. 7) is decreased. Therefore, as the number of read commands RC_NUM performed after the memory device (e.g., 100 of FIG. 7) suspends the currently performed operation is increased, the performance of the storage device (e.g., 50 of FIG. 1) may be improved.

Referring to FIG. 8B, the case where X is '10' and Y and Z are '1' in FIG. 8A is illustrated in FIG. 8B. In other embodiments, the numbers corresponding to X, Y, and Z may vary.

In an embodiment, when the number of read commands RC_NUM is equal to or greater than '10', the delay amount of time tDELAY may be '0', when the number of read commands RC_NUM is '9', the delay amount of time tDELAY may be '1', when the number of read commands RC_NUM is '8', the delay amount of time tDELAY may be '2', and when the number of read commands RC_NUM is less than '8', the delay amount of time tDELAY may be '10'. That is, as the number of read commands RC_NUM stored in the command queue (e.g., 220 of FIG. 7) is decreased, the delay amount of time tDELAY of output of the suspend command SUSPEND_CMD may be increased.

In an embodiment, when a read request is not received from the host (e.g., 300 of FIG. 1) and read operations in response to all read commands stored in the command queue (e.g., 220 of FIG. 7) are terminated while the memory device (e.g., 100 of FIG. 7) is performing the read operation, the memory device (e.g., 100 of FIG. 7) may resume the suspended operation.

However, when read requests are continuously received from the host (e.g., 300 of FIG. 1) and read commands corresponding to the read requests are continuously output to the memory device (e.g., 100 of FIG. 7) while the memory device (e.g., 100 of FIG. 7) is performing the read operations, the number of read operations that are performed may be increased. That is, as the number of read operations that are performed is increased, the number of read operations that can be performed is increased through one time of the operation suspension, and thus the performance of the storage device (e.g., 50 of FIG. 1) may be improved.

FIG. 9 illustrates a ready/busy signal when the output of a suspend command is delayed in accordance with an embodiment of the present disclosure.

Referring to FIGS. 8A, 8B, and 9, FIG. 9 illustrates a ready/busy signal depending on the operation of the memory device (e.g., 100 of FIG. 7) after the delay amount of time tDELAY has been determined as in FIGS. 8A and 8B and the determined delay amount of time tDELAY has elapsed from a time point when the read command is enqueued in the command queue 220.

In an embodiment, the suspension controller (e.g., 240 of FIG. 7) may receive queue information QUEUE_INF from the command queue (e.g., 220 of FIG. 7) and may determine the delay amount of time tDELAY of output of the suspend command SUSPEND_CMD. When the delay amount of time tDELAY is determined, the suspension controller (e.g., 240 of FIG. 7) may not output the suspend command SUSPEND_CMD during the determined delay amount of time tDELAY from a time point when the read command is enqueued in the command queue 220. Therefore, during the delay amount of time tDELAY from a time point when the read command is enqueued in the command queue 220, the memory device (e.g., 100 of FIG. 7) may continue to perform the operation being performed, and the ready/busy signal R/B may be in a low state, indicating a busy state.

In FIG. 9, the read commands stored in the command queue (e.g., 220 of FIG. 7) during the delay amount of time tDELAY are first to third read commands READ_CMD1 to READ_CMD3. In other embodiments, when the delay amount of time tDELAY is lengthened, the number of read commands stored in the command queue (e.g., 220 of FIG. 7) is increased, whereas when the delay amount of time tDELAY is shortened, the number of read commands stored in the command queue (e.g., 220 of FIG. 7) may be decreased.

In an embodiment, after the determined delay amount of time tDELAY has elapsed from a time point when the read command is enqueued in the command queue 220, the suspension controller (e.g., 240 of FIG. 7) may output the suspend command SUSPEND_CMD to the memory device (e.g., 100 of FIG. 7). The memory device (e.g., 100 of FIG. 7) may suspend the operation being performed in response to the suspend command SUSPEND_CMD.

When the operation being performed on the memory device (e.g., 100 of FIG. 7) is a program operation, the memory device (e.g., 100 of FIG. 7) may suspend the program operation during a time tPGMSL, may store log information about the suspended program operation, and may back up program data. During the time tPGMSL, the ready/busy signal RB may be in a low state, indicating a busy state.

Thereafter, the first to third read commands READ_CMD1 to READ_CMD3 stored in the command queue (e.g., 220 of FIG. 7) may be sequentially output to the memory device (e.g., 100 of FIG. 7). When the first to third read commands READ_CMD1 to READ_CMD3 are output to the memory device (e.g., 100 of FIG. 7), the memory device (e.g., 100 of FIG. 7) may perform a read operation in response to the first read command READ_CMD1 for a time tR11, perform a read operation in response to the second read command READ_CMD2 for a time tR12, and perform a read operation in response to the third read command READ_CMD3 for a time tR13. The ready/busy signal RB may be in a low state, indicating a busy state, while the read operations respectively in response to the first to third read commands READ_CMD1 to READ_CMD3 are being performed.

Consequently, the output of the suspend command SUSPEND_CMD may be delayed for the determined delay amount of time tDELAY, and the number of read commands stored in the command queue (e.g., 220 of FIG. 7) may be increased while the output of the suspend command SUSPEND_CMD is delayed. As the number of read commands stored in the command queue (e.g., 220 of FIG. 7) is increased, the number of read operations performed after the memory device (e.g., 100 of FIG. 7) suspends the currently performed operation may be increased, and the performance of the storage device (e.g., 50 of FIG. 1) may be improved.

Figure 10:
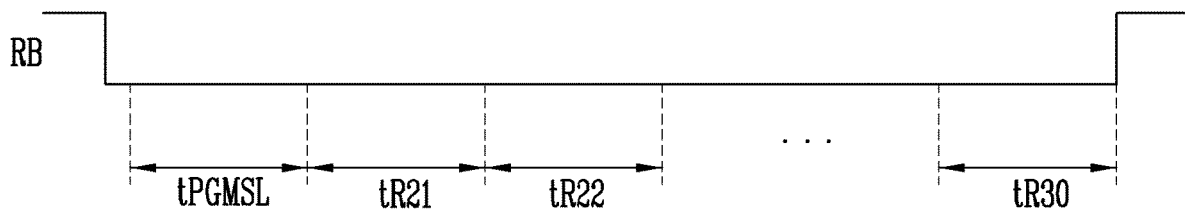
FIG. 10 illustrates a ready/busy signal when the output of a suspend command is not delayed.

FIG. 10 illustrates a ready/busy signal when the output of a suspend command is not delayed in accordance with an embodiment of the present disclosure.

Referring to FIGS. 8A, 8B and 10, FIG. 10 illustrates a ready/busy signal depending on the operation of the memory device (e.g., 100 of FIG. 7) after it is determined that the output of the suspend command SUSPEND_CMD is not to be delayed in FIGS. 8A and 8B.

In an embodiment, the suspension controller (e.g., 240 of FIG. 7) may receive queue information QUEUE_INF from the command queue (e.g., 220 of FIG. 7), and may determine the delay amount of time tDELAY of output of the suspend command SUSPEND_CMD. When the number of read commands RC_NUM stored in the command queue (e.g., 220 of FIG. 7) is equal to or greater than a preset reference value, the suspension controller (e.g., 240 of FIG. 7) may immediately output the suspend command SUSPEND_CMD without delay.

In FIG. 10, the preset reference value is '10', identical to that of FIG. 8B, read commands stored in the command queue (e.g., 220 of FIG. 7) are eleventh to twentieth read commands READ_CMD11 to READ_CMD20, and the number of read commands RC_NUM is 10.

Therefore, because the number of read commands RC_NUM stored in the command queue (e.g., 220 of FIG. 7) is '10', which is the preset reference value, the suspension controller (e.g., 240 of FIG. 7) may immediately output the suspend command SUSPEND_CMD without delay.

In an embodiment, the memory device (e.g., 100 of FIG. 7) may receive the suspend command SUSPEND_CMD from the suspension controller (e.g., 240 of FIG. 7), and may suspend the operation being performed in response to the suspend command SUSPEND_CMD.

When the operation being performed on the memory device (e.g., 100 of FIG. 7) is a program operation, the memory device (e.g., 100 of FIG. 7) may suspend the program operation during a time tPGMSL, may store log information about the suspended program operation, and may back up program data. During the time tPGMSL, the ready/busy signal RB may be in a low state, indicating a busy state.

Thereafter, the eleventh to twentieth read commands READ_CMD11 to READ_CMD20 stored in the command queue (e.g., 220 of FIG. 7) may be sequentially output to the memory device (e.g., 100 of FIG. 7).

When the eleventh to twentieth read commands READ_CMD11 to READ_CMD20 are output to the memory device (e.g., 100 of FIG. 7), the memory device (e.g., 100 of FIG. 7) may perform a read operation in response to the eleventh read command READ_CMD11 for a time tR21, may perform a read operation in response to the twelfth read command READ_CMD12 for a time tR22, may perform a read operation in response to the thirteenth read command READ_CMD13 for a time tR23, may perform a read operation in response to the fourteenth read command READ_CMD14 for a time tR24, may perform a read operation in response to the fifteenth read command READ_CMD15 for a time tR25, may perform a read operation in response to the sixteenth read command READ_CMD16 for a time tR26, may perform a read operation in response to the seventeenth read command READ_CMD17 for a time tR27, may perform a read operation in response to the eighteenth read command READ_CMD18 for a time tR28, may perform a read operation in response to the nineteenth read command READ_CMD19 for a time tR29, and may perform a read operation in response to the twentieth read command READ_CMD20 for a time tR30. The ready/busy signal RB may be in a low state, indicating a busy state, while the read operations respectively in response to the eleventh to twentieth read commands READ_CMD11 to READ_CMD20 are being performed.

As a result, when the number of read commands RC_NUM stored in the command queue (e.g., 220 of FIG. 7) is equal to or greater than the preset reference value, the suspend command SUSPEND_CMD may be immediately output without delay, so that read operations in response to the read commands stored in the command queue (e.g., 220 of FIG. 7) may be rapidly performed within a short period of time.

Figure 11:
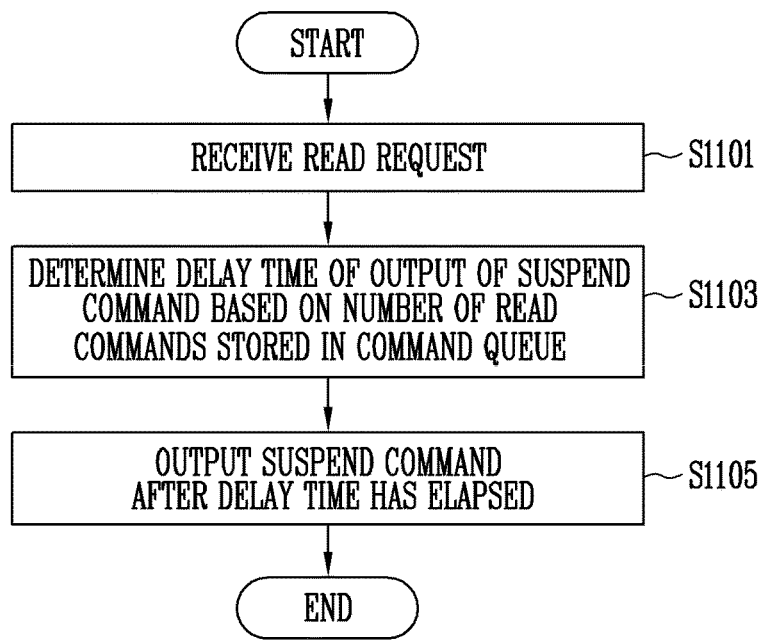
FIG. 11 is a flowchart illustrating the operation of a memory controller according to an embodiment of the present disclosure.

FIG. 11 is a flowchart illustrating the operation of a memory controller according to an embodiment of the present disclosure.

Referring to FIG. 11, at operation S1101, the memory controller may receive a read request from a host while a memory device is performing a program operation or an erase operation. In an embodiment, when a read request is received from the host, the memory controller may control the memory device so that the operation being performed on the memory device is suspended and a read operation in response to the read request is preferentially performed.

At operation S1103, the memory controller may determine the delay amount of time of output of a suspend command based on the number of read commands stored in the command queue.

For example, when the number of read commands stored in the command queue is equal to or greater than the preset reference value, the memory controller may determine to output the suspend command without delay. However, when the number of read commands stored in the command queue is less than the preset reference value, the delay amount of time may be determined depending on the number of read commands stored in the command queue.

In an embodiment, when the number of read commands stored in the command queue is small, the delay amount of time may be lengthened, whereas when the number of read commands stored in the command queue is large, the delay amount of time may be shortened.

At operation S1105, the memory controller may output the suspend command to the memory device after the determined delay amount of time has elapsed from a time point when the read command is enqueued in the command queue 220. The memory device may suspend the operation being performed in response to the suspend command.

Figure 12:
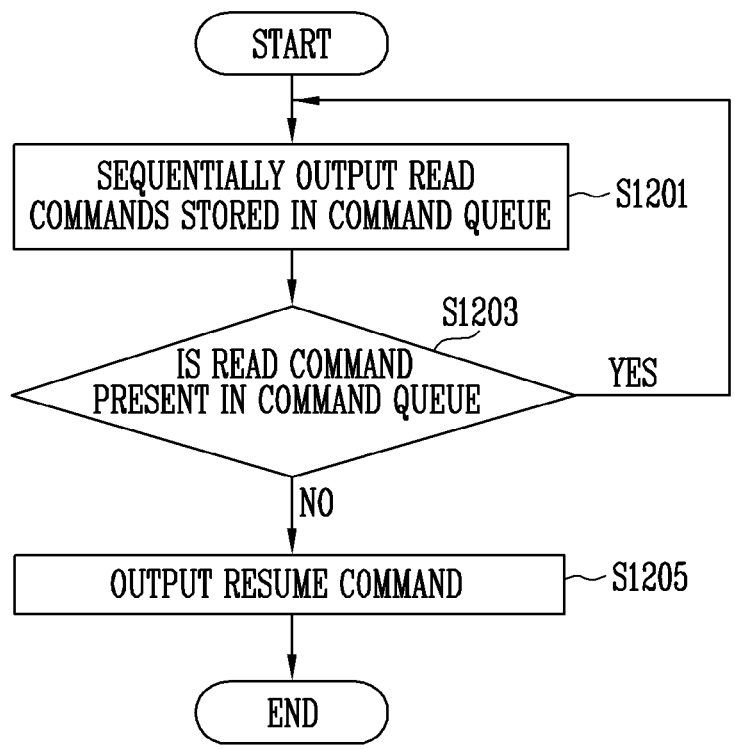
FIG. 12 is a flowchart illustrating the operation of a memory controller according to an embodiment of the present disclosure.

FIG. 12 is a flowchart illustrating the operation of a memory controller according to an embodiment of the present disclosure.

Referring to FIGS. 11 and 12, detailed operations, performed after the suspend command is output at operation S1105 of FIG. 11, are illustrated in FIG. 12.

At operation S1201, the memory controller may sequentially output the read commands stored in the command queue. That is, after the memory device suspends the currently performed operation in response to the suspend command, the memory controller may sequentially output read commands, and the memory device may perform read operations in response to the read commands.

At operation S1203, the memory controller may determine whether a read command is present in the command queue. When a read command is present in the command queue (in the case of Y), the process may proceed to operation S1201, where commands stored in the command queue may be sequentially output. That is, when read commands are continuously stored in the command queue after the memory device suspends the currently performed operation, the memory controller may continue to output the stored read commands to the memory device.

However, when no read command is present in the command queue (in the case of N), the process may proceed to operation S1205.

At operation S1205, when there is no read command to be executed by the memory device, the memory controller may output a resume command for resuming the suspended operation. When the resume command is output from the memory controller, the memory device may resume the suspended operation in response to the resume command.

Figure 13:
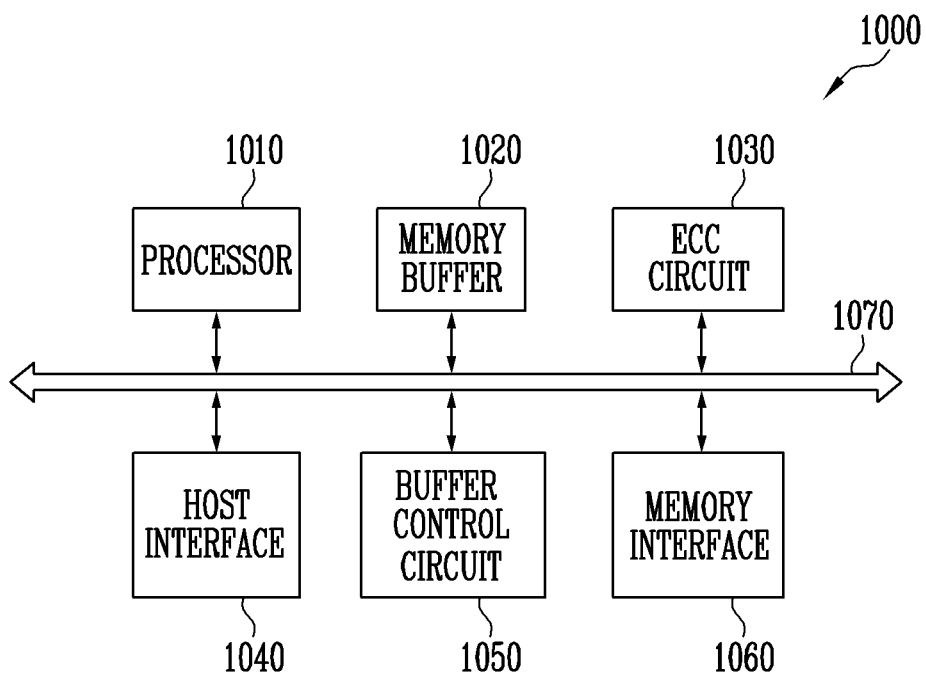
FIG. 13 is a diagram illustrating an example of the memory controller of FIG. 1.

FIG. 13 is a diagram illustrating an example of the memory controller of FIG. 1 in accordance with an embodiment of the present disclosure.

A memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

Referring to FIG. 13, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may run software or firmware to perform the randomizing or derandomizing operation.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication standards or interfaces such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the processor 1010 may receive a read request from the host (e.g., 300 of FIG. 1) while the memory device (e.g., 100 of FIG. 1) is performing a program operation or a read operation. The read request may be a request instructing data stored in a selected page, among a plurality of pages included in the memory device (e.g., 100 of FIG. 1), to be read.

When the read request is received from the host (e.g., 300 of FIG. 1), the processor 1010 may determine the number of read commands stored in a command queue. The command queue may be included in the memory buffer 1020.

The processor 1010 may determine the delay amount of time of output of a suspend command based on the result of determining the number of read commands stored in the command queue. Here, when the number of read commands stored in the command queue becomes larger, the delay amount of time of output of the suspend command may be shortened, whereas when the number of read commands stored in the command queue becomes smaller, the delay amount of time of output of the suspend command may be lengthened.

Therefore, when the number of read commands stored in the command queue is large, read operations in response to the read commands stored in the command queue may be rapidly performed within a short period of time by setting the delay amount of time of output of the suspend command to a shorter time. In contrast, when the number of read commands stored in the command queue is small, more read commands may be stored in the command queue and read operations in response to the more read commands may be performed, by setting the delay amount of time of output of the suspend command to a longer time.

In an embodiment, the processor 1010 may output the suspend command to the memory device (e.g., 100 of FIG. 1) after the determined delay amount of time has elapsed from a time point when the read command is enqueued in the command queue 220. The memory device (e.g., 100 of FIG. 1) may suspend the operation being performed in response to the suspend command.

In an embodiment, when the operation being performed on the memory device (e.g., 100 of FIG. 1) is suspended, the read commands stored in the command queue may be sequentially output to the memory device (e.g., 100 of FIG. 1). The memory device (e.g., 100 of FIG. 1) may perform read operations in response to the sequentially received read commands.

As a result, the time point at which the suspend command is output may be delayed depending on the number of read commands stored in the command queue, so that more read commands may be stored in the command queue, and the memory device (e.g., 100 of FIG. 1) may perform read operations in response to the more read commands after the suspension of the currently performed operation. Therefore, the performance of the storage device (e.g., 50 of FIG. 1) may be improved.

Figure 14:
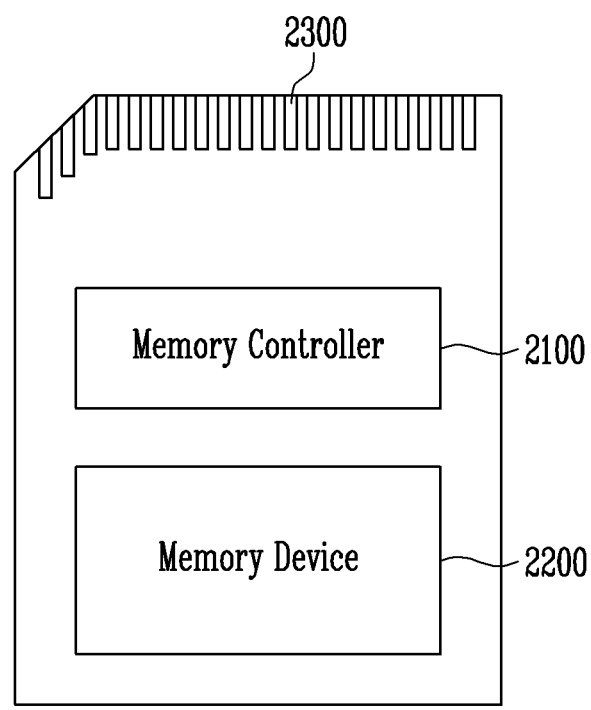
FIG. 14 is a block diagram illustrating a memory card system to which a storage device according to an embodiment of the present disclosure is applied.

FIG. 14 is a block diagram illustrating a memory card system to which a storage device according to an embodiment of the present disclosure is applied.

Referring to FIG. 14, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory device 2200 may be implemented in the same way as the memory device (e.g., 100 of FIG. 1) described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication standards or interfaces such as universal serial bus (USB), multi-media card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication standards or interfaces.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin Transfer Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

In an embodiment, the memory controller 2100 may receive a read request from the host (e.g., 300 of FIG. 1) while the memory device 2200 is performing a program operation or a read operation. The read request may be a request instructing data stored in a selected page, among a plurality of pages included in the memory device 2200, to be read.

When the read request is received from the host (e.g., 300 of FIG. 1), the memory controller 2100 may determine the number of read commands stored in a command queue. The memory controller 2100 may determine the delay amount of time of output of a suspend command based on the result of determining the number of read commands stored in the command queue. Here, when the number of read commands stored in the command queue is large, the delay amount of time of output of the suspend command may be shortened, whereas as the number of read commands stored in the command queue is small, the delay amount of time of output of the suspend command may be lengthened.

Therefore, when the number of read commands stored in the command queue becomes larger, read operations in response to the read commands stored in the command queue may be rapidly performed within a short period of time by setting the delay amount of time of output of the suspend command to a shorter time. In contrast, when the number of read commands stored in the command queue is small, more read commands may be stored in the command queue and read operations in response to the more read commands may be performed, by setting the delay amount of time of output of the suspend command to a longer time.

In an embodiment, the memory controller 2100 may output the suspend command to the memory device 2200 after the determined delay amount of time has elapsed from a time point when the read command is enqueued in the command queue 220. The memory device 2200 may suspend the operation being performed in response to the suspend command.

In an embodiment, when the operation being performed on the memory device 2200 is suspended, the read commands stored in the command queue may be sequentially output to the memory device 2200. The memory device 2200 may perform read operations in response to the sequentially received read commands.

As a result, the time point at which the suspend command is output may be delayed depending on the number of read commands stored in the command queue, so that more read commands may be stored in the command queue, and the memory device 2200 may perform read operations in response to the more read commands after the suspension of the currently performed operation. Therefore, the performance of the memory card system 2000 may be improved.

Figure 15:
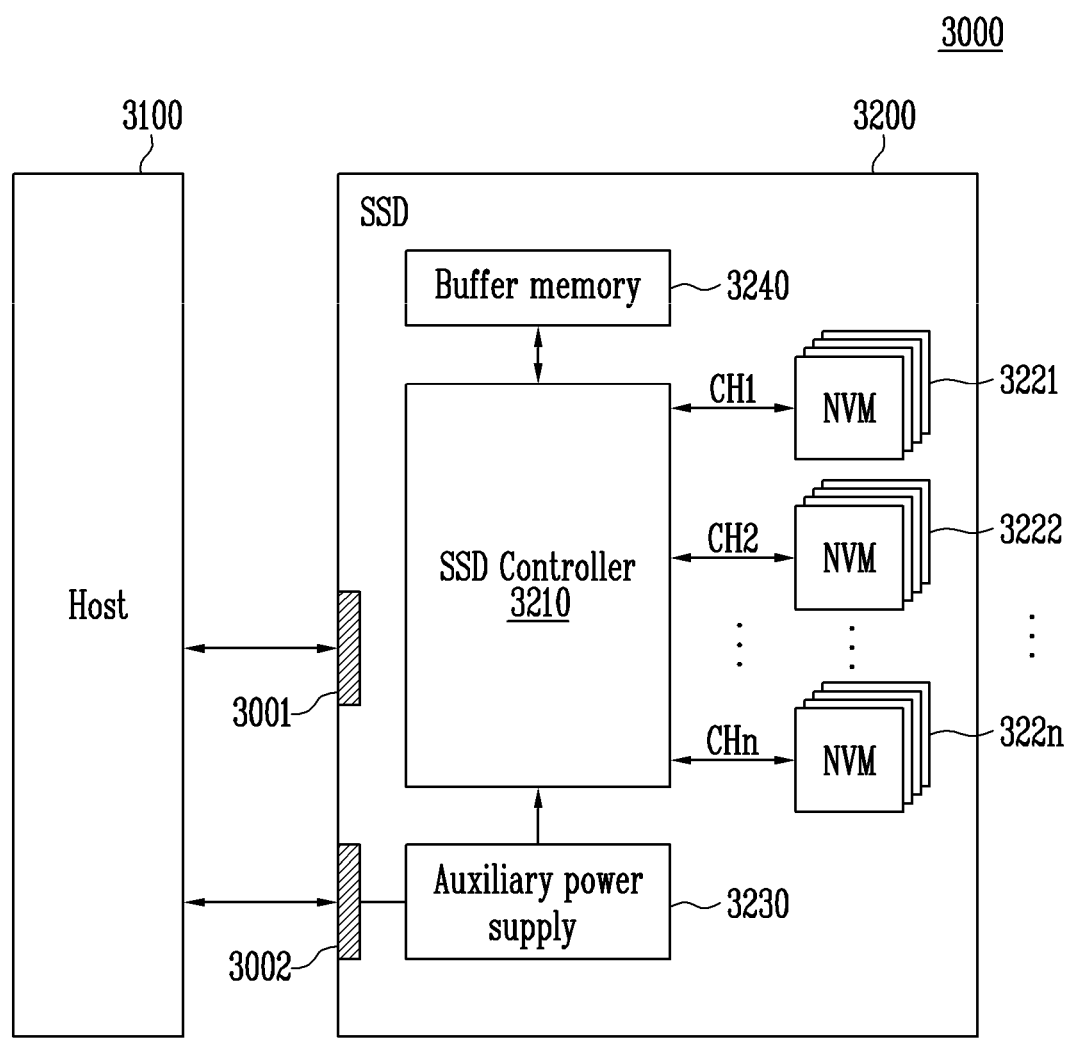
FIG. 15 is a block diagram illustrating an example of a solid state drive (SSD) system to which a storage device according to an embodiment of the present disclosure is applied.

FIG. 15 is a block diagram illustrating an example of a solid state drive (SSD) system to which a storage device according to an embodiment of the present disclosure is applied.

Referring to FIG. 15, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories or a plurality of nonvolatile memories (NVMs) 3221 to 322n, an auxiliary power supply 3230, and a buffer memory 3240.

In an embodiment, the SSD controller 3210 may perform the function of the memory controller (e.g., 200 of FIG. 1) described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various communication standards or interfaces such as universal serial bus (USB), multi-media card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power to the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

In an embodiment, the SSD controller 3210 may receive a read request from the host 3100 while the plurality of flash memories 3221 to 322n are performing a program operation or a read operation. The read request may be a request instructing data stored in a selected page, among a plurality of pages included in each of the plurality of flash memories 3221 to 322n, to be read.

When the read request is received from the host 3100, the SSD controller 3210 may determine the number of read commands stored in a command queue. The SSD controller 3210 may determine the delay amount of time of output of a suspend command based on the result of determining the number of read commands stored in the command queue. Here, when the number of read commands stored in the command queue is large, the delay amount of time of output of the suspend command may be shortened, whereas when the number of read commands stored in the command queue is small, the delay amount of time of output of the suspend command may be lengthened.

Therefore, when the number of read commands stored in the command queue is large, read operations in response to the read commands stored in the command queue may be rapidly performed within a short period of time by setting the delay amount of time of output of the suspend command to a shorter time. In contrast, when the number of read commands stored in the command queue is small, more read commands may be stored in the command queue and read operations in response to the more read commands may be performed, by setting the delay amount of time of output of the suspend command to a longer time.

In an embodiment, the SSD controller 3210 may output the suspend command to the plurality of flash memories 3221 to 322n after the determined delay amount of time has elapsed from a time point when the read command is enqueued in the command queue 220. Each of the plurality of flash memories 3221 to 322n may suspend the operation being performed in response to the suspend command.

In an embodiment, when the operation being performed on each of the plurality of flash memories 3221 to 322n is suspended, the read commands stored in the command queue may be sequentially output to the plurality of flash memories 3221 to 322n. The plurality of flash memories 3221 to 322n may perform read operations in response to the sequentially received read commands.

As a result, the time point at which the suspend command is to be output may be delayed depending on the number of read commands stored in the command queue, so that more read commands may be stored in the command queue, and the plurality of flash memories 3221 to 322n may perform read operations in response to the more read commands after the suspension of the currently performed operation. Therefore, the performance of the SSD 3200 may be improved.

Figure 16:
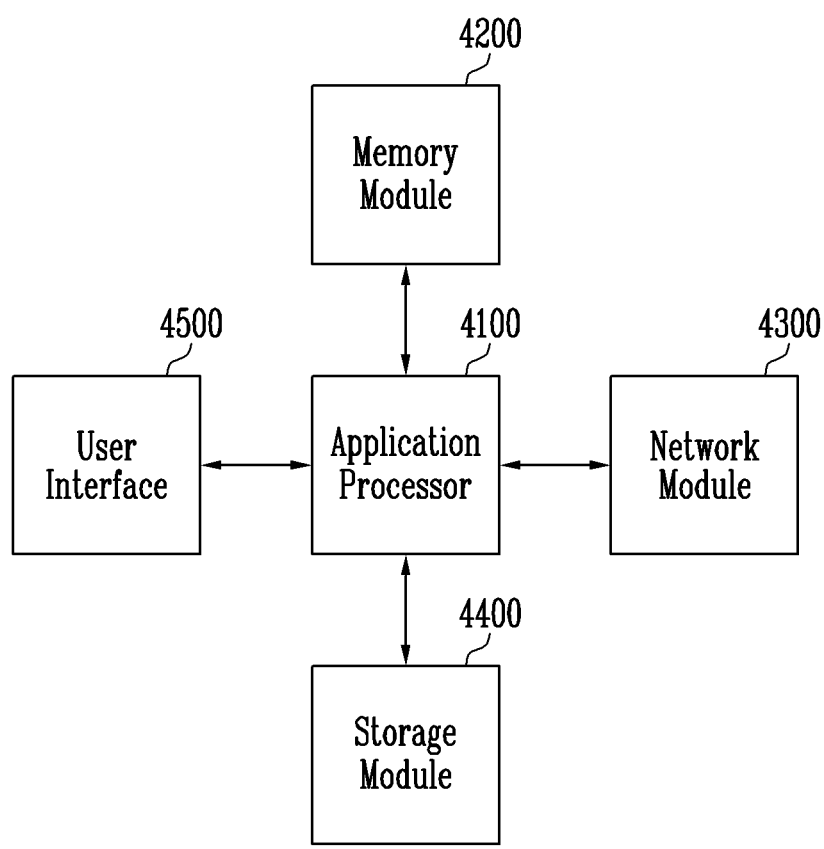
FIG. 16 is a block diagram illustrating a user system to which a storage device according to an embodiment of the present disclosure is applied.

FIG. 16 is a block diagram illustrating a user system to which a storage device according to an embodiment of the present disclosure is applied.

Referring to FIG. 16, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device described above with reference to FIGS. 2 and 3. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In an embodiment, the application processor 4100 may receive a read request from a host (e.g., 300 of FIG. 1) while the storage module 4400 is performing a program operation or a read operation. The read request may be a request instructing data stored in a selected page, among a plurality of pages included in the storage module 4400, to be read.

When the read request is received from the host (e.g., 300 of FIG. 1), the application processor 4100 may determine the number of read commands stored in a command queue. The application processor 4100 may determine the delay amount of time of output of a suspend command based on the result of determining the number of read commands stored in the command queue. Here, when the number of read commands stored in the command queue becomes larger, the delay amount of time of output of the suspend command may be shortened, whereas when the number of read commands stored in the command queue becomes smaller, the delay amount of time of output of the suspend command may be lengthened.

Therefore, when the number of read commands stored in the command queue is large, read operations in response to the read commands stored in the command queue may be rapidly performed within a short period of time by setting the delay amount of time of output of the suspend command to a shorter time. In contrast, when the number of read commands stored in the command queue is small, more read commands may be stored in the command queue and read operations in response to the more read commands may be performed, by setting the delay amount of time of output of the suspend command to a longer time.

In an embodiment, the application processor 4100 may output the suspend command to the storage module 4400 after the determined delay amount of time has elapsed from a time point when the read command is enqueued in the command queue 220. The storage module 4400 may suspend the operation being performed in response to the suspend command.

In an embodiment, when the operation being performed on the storage module 4400 is suspended, the read commands stored in the command queue may be sequentially output to the storage module 4400. The storage module 4400 may perform read operations in response to the sequentially received read commands.

As a result, the time point at which the suspend command is to be output may be delayed depending on the number of read commands stored in the command queue, so that more read commands may be stored in the command queue, and the storage module 4400 may perform read operations in response to the more read commands after the suspension of the currently performed operation. Therefore, the performance of the user system 4000 may be improved.

In accordance with the present disclosure, the delay amount of time of output of a suspend command is determined depending on the number of read commands stored in a command queue before the suspend command is output, and thus the number of read operations to be performed during a suspend period may be increased.

Although a memory controller and an operating method thereof have been described with reference to the specific embodiments, these are merely examples, and the present disclosure is not limited thereto, and should be interpreted to have the widest scope according to the basic idea disclosed in the present specification. Those skilled in the art may carry out unspecified embodiments by combining and substituting the disclosed embodiments, but these also do not depart from the scope of the present disclosure. In addition, those skilled in the art may easily change or modify the embodiments disclosed based on the present specification, and it is apparent that such changes or modifications also fall within the scope of the present disclosure and the following claims. Furthermore, the embodiments may be combined to form additional embodiments.

What is claimed is:

1. A memory controller for controlling a memory device, comprising:
   a host interface configured to receive a request from a host;
   a processor configured to generate a command corresponding to the request;
   a command queue configured to store the generated command; and
   a memory interface configured to provide the memory device with the command stored in the command queue or a suspend command, generated by the processor,
   wherein, when a read request is input through the host interface while the memory device is performing an operation, the processor is further configured to:
   determine a delay amount of time for output of the suspend command that instructs suspension of the operation, based on a number of read commands stored in the command queue, and
   output, after the delay amount of time has elapsed, the suspend command, and
   wherein a length of the delay amount of time depends on the number of read commands.

2. The memory controller according to claim 1, wherein the processor is configured to, when the number of read commands stored in the command queue is equal to or greater than a first reference value, determine the delay amount of time to be '0'.

3. The memory controller according to claim 2, wherein the processor is configured to, when the number of read commands stored in the command queue is equal to or greater than a second reference value and less than the first reference value, determine the delay amount of time to be a first amount of time.

4. The memory controller according to claim 3, wherein the processor is configured to, when the number of read commands stored in the command queue is less than the second reference value, determine the delay amount of time to be a second amount of time that is longer than the first amount of time.

5. The memory controller according to claim 1, wherein the processor determines the delay amount of time so that the number of read commands stored in the command queue and the delay amount of time are in inverse proportion to each other.

6. The memory controller according to claim 1, wherein the processor controls the command queue to provide the memory device with the read commands stored therein after the suspend command has been provided to the memory device.

7. The memory controller according to claim 6, wherein the processor controls the command queue so that the read commands stored in the command queue are provided to the memory device while read operations corresponding to the read commands stored in the command queue are being performed.

8. The memory controller according to claim 6, wherein the processor is further configured to output, after the memory device has completed read operations in response to the provided read commands, a resume command that instructs resumption of the suspended operation.

9. A method of operating a memory controller including a command queue in which commands to be performed by a memory device are stored, the method comprising:

sequentially providing the commands stored in the command queue to the memory device;
determining a delay amount of time for output of a suspend command that instructs suspension of an operation depending on a number of read commands stored in the command queue when a read request is input thereto from a host while the memory device is performing the operation in response to each of the provided commands;
providing, after the delay amount of time has elapsed, the memory device with the suspend command; and
providing, after the suspend command has been provided to the memory device, the memory device with the read commands stored in the command queue,
wherein a length of the delay amount of time depends on the number of read commands.

10. The method according to claim 9, wherein the operation is a program operation or an erase operation.

11. The method according to claim 9, wherein the delay amount of time is determined so that the number of read commands stored in the command queue and the delay amount of time are in inverse proportion to each other.

12. The method according to claim 9, wherein the delay amount of time is determined to be '0' when the number of read commands stored in the command queue is equal to or greater than a reference value.

13. The method according to claim 9, wherein the delay amount of time is determined so that the delay amount of time becomes smaller when the number of read commands stored in the command queue becomes larger.

14. The method according to claim 9, further comprising outputting a read command newly stored in the command queue while read operations corresponding to the read commands stored in the command queue are being performed.

15. The method according to claim 9, further comprising providing, after read operations are completed in response to the read commands provided to the memory device from the command queue, the memory device with a resume command that instructs resumption of the suspended operation.

16. A storage device, comprising:
   a memory device configured to perform an operation in response to an input command; and
   a memory controller configured to:
   receive a request from a host,
   generate a command corresponding to the request,
   store the generated command in a command queue,
   control the command queue to provide the memory device sequentially with commands stored in the command queue, as the input command,
   determine, when a read request is input thereto from the host while the memory device is performing an operation in response to each of the commands, a delay amount of time for output of a suspend command that instructs suspension of the operation based on a number of read commands stored in the command queue, and
   provide, after the delay amount of time has elapsed, the memory device with the suspend command,
   wherein a length of the delay amount of time depends on the number of read commands.

17. The storage device according to claim 16, wherein:
   the memory device is further configured to suspend the operation in response to the suspend command, and
   when the operation is suspended, the memory controller is further configured to provide the memory device with the read commands stored in the command queue.

18. The storage device according to claim 16, wherein the memory controller determines the delay amount of time so that the number of read commands stored in the command queue and the delay amount of time are in inverse proportion to each other.

19. The storage device according to claim 16, wherein the memory controller determines the delay amount of time to be '0' when the number of read commands stored in the command queue is equal to or greater than a reference value.

20. The storage device according to claim 19, wherein the memory controller determines the delay amount of time to increase as the number of read commands stored in the command queue decreases when the number of read commands stored in the command queue is less than the reference value.

* * * * *